United States Patent [19]

Barsotti et al.

[11] Patent Number: 5,017,435

[45] Date of Patent: * May 21, 1991

[54] MULTI-COMPONENT COATING COMPOSITION COMPRISING AN ANHYDRIDE CONTAINING POLYMER, A GLYCIDYL COMPONENT AND A MONOMERIC OR OLIGOMERIC ANHYDRIDE COMPONENT

[75] Inventors: Robert J. Barsotti, Franklinville, N.J.; Lili W. Altschuler, Wynwood; Lee R. Harper, Media, both of Pa.

[73] Assignee: E. I. Du Pont de Nemours and Company, Wilmington, Del.

[ * ] Notice: The portion of the term of this patent subsequent to Mar. 28, 2006 has been disclaimed.

[21] Appl. No.: 212,055

[22] Filed: Jun. 27, 1988

[51] Int. Cl.$^5$ .................. B32B 27/42; C08L 63/00
[52] U.S. Cl. ................... 428/502; 428/522; 525/114; 525/117; 523/400
[58] Field of Search ............. 525/114, 117; 523/400; 428/502, 522

[56] References Cited

U.S. PATENT DOCUMENTS

| | | | |
|---|---|---|---|
| 2,782,131 | 2/1957 | Johnson | 428/502 |
| 3,136,736 | 6/1964 | Washburne et al. | 260/45.5 |
| 4,097,449 | 6/1978 | Heilman et al. | 525/117 |
| 4,404,248 | 9/1983 | Spinelli et al. | 428/502 |
| 4,452,948 | 6/1984 | Marrion et al. | 525/207 |
| 4,507,411 | 3/1985 | Gordon et al. | 523/436 |
| 4,601,944 | 7/1986 | Zussman | 525/114 |
| 4,732,791 | 3/1988 | Blackburn et al. | 427/407 |
| 4,816,500 | 3/1989 | Corcoran | 525/117 |

FOREIGN PATENT DOCUMENTS 0123793  1/1984  European Pat. Off. .
994881   6/1965  United Kingdom .

*Primary Examiner*—Lewis T. Jacobs
*Assistant Examiner*—Karen A. Hellender

[57] ABSTRACT

A coating composition useful for a finish for automobiles and trucks in which the film forming binder contains reactive binder components of about (a) 25-90% by weight, based on the weight of the binder, of an acrylic polymer having at least two reactive anhydride groups composed of polymerized monomers of an ethylenically unsaturated anhydride and polymerized monomers from the group consisting of alkyl methacrylate, alkyl acrylate and any mixtures thereof, wherein the alkyl groups have 1-8 carbon atoms and the polymer has a weight average molecular weight of about 2,000-50,000;

(b) 5-50% by weight, based on the weight of the binder, of a glycidyl component having at least two reactive glycidyl groups;

(c) 5-40% by weight, based on the weight of the binder, of a monomeric or oligomeric anhydride component; and the composition contains about 0.1-5% by weight, based on the weight of the binder, of a catalyst.

15 Claims, No Drawings

MULTI-COMPONENT COATING COMPOSITION COMPRISING AN ANHYDRIDE CONTAINING POLYMER, A GLYCIDYL COMPONENT AND A MONOMERIC OR OLIGOMERIC ANHYDRIDE COMPONENT

This invention is related to a multi-component coating composition.

There are a wide variety of multi-component coating compositions available for finishing substrates. Typically with these compositions, the components are mixed together before application and then the resulting composition is applied by conventional techniques such as spraying and the composition is cured at ambient temperatures or can be cured at elevated temperatures. These compositions are used to finish original equipment, automobiles and trucks, refinish automobiles and trucks, paint structures such as bridges and buildings, paint appliances, metal cabinets and the like.

Representative of such compositions are shown in the following patents:

Gordon et al. U.S. Pat. No. 4,507,411, issued March 26, 1985 shows a two component composition of a functionalized polymeric component and glycidyl component that in the presence of an amine, alcohol, ketimine, acetal or oxazolidine cures at ambient temperatures. However, the compositions disclosed are not useful for finishes for automobiles and trucks.

European Patent Application 0,123,793 shows a two component composition in which one component has an anhydride ring that is opened with an amine and has a second component that contains glycidyl groups. Finishes formed from such compositions are not useful for automobiles and trucks since the finishes whiten and blister on exposure to high humidity conditions and exhibit recoat lifting when repaired within several days after the finish has been applied.

U.S. Pat. No. 3,136,736 issued June 9, 1964, to Wyncote et al and British patent 994,881 assigned to Rohm and Haas concern coating compositions comprising polyepoxides and maleic anhydride copolymers. The patents do not teach or suggest the use of a monomeric anhydride component to lower volatile organic components (VOCs) levels.

U.S. Pat. No. 4,732,791 issued March 22, 1988, to Blackburn et al concerns a coating composition comprising polyepoxides, a monomeric anhydride curing agent and a low number average molecular weight hydroxyl group containing polyfunctional function material. The Blackburn composition differs significantly from Applicants, invention because it must be heated to cure, it requires a hydroxy functional component and it does not contain a polymeric anhydride component.

There is a need for a coating composition that cures at ambient temperatures and provides a high quality finish that is useful as an exterior finish or refinish for automobiles and trucks that has excellent adhesion to the substrate to which it is applied, good outdoor weatherability and humidity resistance and an excellent appearance.

Furthermore, because of environmental concerns about volatile organic components (VOCs) there is a need for such a coating composition with a high solids content which retains its sprayability. Many previous multi-component coating compositions have had to have a solids content of less than 35 percent to ensure sprayability. There is a need for a sprayable coating composition with a solids content of greater than 55 percent which retains an excellent mix of other desirable coating composition qualities such as pot life, hardness, durability and humidity resistance.

SUMMARY OF THE INVENTION

A coating composition containing 20-80% by weight of reactive binder components and 80-20% by weight of an organic carrier:
the binder contains
(a) an anhydride acrylic polymer having at least two anhydride groups and having a weight average molecular weight of about 2,000-50,000;
(b) a component having at least two reactive glycidyl groups;
(c) a monomeric or oligomeric anhydride component, and
the composition contains about 0.1-5% by weight, based on the weight of the binder, of a catalyst.

DETAILED DESCRIPTION OF THE INVENTION

The film forming binder of the coating composition of this invention contains components that are mixed together before application. The film forming binder content of the composition is about 20-80% by weight of an organic carrier which usually is a solvent for the binder.

The composition forms an excellent clear coating over colored pigmented finishes. The coating has good adhesion to the pigmented finish, has excellent humidity resistance and is weatherable and durable. The composition is useful for finishing and refinishing the exterior of automobiles and trucks and the composition can be pigmented to form a colored finish. Also, the composition can be used over plastic substrates used in automobiles and trucks such as filler panels, side panels, fender extensions, moldings and other trim parts.

The composition also can be pigmented to form a colored finish. These pigmented compositions are useful as exterior original equipment and refinish coatings for automobiles and trucks, as maintenance coatings for tanks, bridges, buildings such as factories and oil refineries and as industrial coatings for appliances, metal cabinets, shelves and the like.

Preferably, the coating composition has a high solids content and contains about 40-80% by weight binder and 20-60% by weight of organic solvent. The binder of the composition contains about 25-90% by weight of anhydride acrylic polymer containing at least two anhydride groups, 5-50% by weight of a glycidyl containing component and 5-40% by weight of a monomeric or oligomeric anhydride.

The anhydride acrylic polymer has a weight average molecular weight of about 2,000-50,000 determined by gel permeation chromatography using polymethyl methacrylate as a standard and preferably, has a weight average molecular weight of 3,000-25,000.

The anhydride acrylic polymer is prepared by conventional techniques in which the monomers, solvent, and conventional catalysts such as t-butyl perbenzoate are charged into a polymerization vessel and heated to about 75°-200° C. for about 0.5-6 hours to form the polymer.

The anhydride acrylic polymer is formed by polymerizing monomers of alkyl methacrylates, or alkyl acrylates or mixtures thereof, where the alkyl groups have 1-12 carbon atoms and ethylenically unsaturated anhydrides (or ethylenically unsaturated dicarboxylic acids which are converted to the acid anhydride during the polymerization). Optionally, the anhydride acrylic polymer can contain other components such as styrene, α-methyl styrene, acrylonitrile, methacrylonitrile in amounts of about 0.1-50% by weight.

Typical alkyl acrylates and methacrylates that ca be used to form the anhydride acrylic polymer are as follows: methyl methacrylate, ethyl methacrylate, propyl methacrylate, butyl methacrylate, pentyl methacrylate, hexyl methacrylate, octyl methacrylate decyl methacrylate, lauryl methacrylate, methyl acrylate, ethyl acrylate, propyl acrylate, butyl acrylate, octyl acrylate, nonyl acrylate, decyl acrylate, lauryl acrylate and the like. Other components that can be used to form the anhydride acrylic polymer are acrylamide, methacrylamide, acrylo alkoxy silanes such as gamma methacryloyl propyl trimethoxy silane. Also the anhydride acrylic polymer can contain about 0.1-5% by weight of an ethylenically unsaturated acid such as acrylic acid, methacrylic acid, itaconic acid, maleic acid and the like.

Typically useful ethylenically unsaturated anhydrides are as follows: itaconic anhydride, maleic anhydride, isobutenyl succinic anhydride and the like. It is also possible to impart the anhydride functionality to the anhydride acrylic polymer by using the appropriate ethylenically unsaturated dicarboxylic acid which converts to the corresponding acid anhydride by simple heating. Ethylenically unsaturated dicarboxylic acids that can be used are itaconic acid, maleic acid, isobutenyl succinic acid and the like.

Preferred anhydride acrylic polymers are as follows: styrene/butyl methacrylate/butyl acrylate/itaconic anhydride, methyl methacrylate/butyl acrylate/itaconic anhydride, butyl acrylate/styrene/maleic anhydride/maleic acid, methyl methacrylate/butyl acrylate/itaconic anhydride.

The glycidyl component contains at least two glycidyl groups and can be an oligomer or a polymer. Typical glycidyl components are as follows: sorbitol polyglycidyl ether, mannitol polyglycidyl ether, pentaerythritol polyglycidol ether, glycerol polyglycidyl ether, low molecular weight epoxy resins such as epoxy resins of epichlorohydrin and bisphenol A., di- and polyglycidyl esters of acids, polyglycidyl ethers of isocyanurates, such as "Denecol" EX301 from Nagase. Sorbitol polyglycidyl ether, such as Araldite XUGY-358 ® from Ciba-Geigy, and di- and polyglycidyl esters of acids, such as Araldite CY-184 ® from Ciba-Geigy, are preferred since they form high quality finishes.

Glycidyl methacrylate or acrylate containing acrylic polymers can be used such as random and block polymers of glycidyl methacrylate/butyl methacrylate. The block polymers can be prepared by anionic polymerization or by group transfer polymerization.

The monomeric or oligomeric anhydride component is added to the composition in order to achieve sprayability at a high solids content. With the monomeric or oligomeric anhydride component the weight solids content can be increased up to 60-70% without adversely affecting sprayability or other desired coating characteristics.

The anhydrides can be monomeric or oligomeric compounds and thus are low in viscosity, high in solids, low in volatility and high in reactivity with the other components in the finish. These include, but are not limited to, hexahydrophthalic anhydride, methyl hexahydrophthalic anhydride, succinic anhydride, hexyl succinic anhydride, dodecyl succinic anhydride, hexadecylsuccinic anhydride, nadic methyl anhydride, and isoprene disuccinic anhydride.

Typical solvents used to prepare the anhydride acrylic polymer and used as a diluent for the coating composition are as follows: toluene, xylene, butyl acetate, ethyl benzene, higher boiling aromatic hydrocarbons, amyl acetate, ethyl acetate, propyl acetate, ethylene or propylene glycol mono alkyl ether acetates.

In addition to the solvents listed above certain alcoholic solvents are also useful. The alcoholic solvents under certain use conditions convert portions of the anhydride to a half ester also useful as reactants in this system. Examples of such alcohols are propanol, isobutanol, methanol, isopropanol, tertiarty butanol, n-butanol, propylene glycol monomethyl ether, ethylene glycol mono butyl ether, and other alcoholic solvents.

About 0.1-5% by weight, based on the weight of the binder of the coating composition, of a catalyst is added to enhance curing of the composition. Typical catalysts are as follows: triethylene diamine, quinuclidine, dialkyl alkanol amines such as dimethyl ethanolamine, diethyl ethanol amine, dibutyl ethanol amine, diethyl hexanol amine and the like, lithium tertiary butoxide, tri(dimethylaminomethyl)phenol, bis(dimethylamino)propan-2-ol, N,N,N$^1$,N$^1$-tetramethylethylenediamine, N,methyldiethanolamine, N,N-dimethyl-1,3-propanediamine and 1-dimenthylamino-2-propanol or quarternary ammonium salts such as tert-butyl ammonium bromide, benzyl trimethyl ammonium formate and the like.

The catalyst need not be added to the coating composition. After an article is coated, the article is passed into a chamber containing catalyst vapors. Dimethylethanol amine is a catalyst that can be vaporized and used to cure the composition. Also, to achieve curing, the catalyst can be sprayed with the coating composition using a dual spray gun.

Generally, the composition is applied by conventional techniques such as spraying and electrostatic spraying. The resulting coating can be dried and cured at ambient temperatures or can be cured at elevated temperatures of 60 to 200° C. At ambient temperatures, the coating dries to a tack free condition in about 180 minutes and in about 24 hours the coating is substantially cured. In about 5-7 days, the coating is completely cured. Coatings are applied to form a finish about 0.5-5 mils thick, and preferably 1-2 mils thick. The finish has excellent gloss, good adhesion to substrate, excellent weatherability, and high solids.

To improve weatherability of the clear finish of the coating composition, about 0.1-5%, by weight, based on the weight of the binder, of an ultraviolet light stabilizer or a combination of ultraviolet light stabilizers can be added. These stabilizers include ultraviolet light absorbers, screeners, quenchers and specific hindered amine light stabilizers. Also, about 0.1-5% by weight, based on the weight of the binder, of an antioxidant can be added.

Typical ultraviolet light stabilizers that are useful are as follows:

Benzophenones such as hydroxydodecyclobenzophenone, 2,4-dihydroxybenzophenone, hydroxy-benzophenones containing sulfonic acid groups, 2,4-dihydroxy-3',5'-di-t-butylbenzophenone, 2,2',4'-trihydroxybenzophenone esters of dicarboxylic acids, 2-hydroxy-4-acryloxyethoxybenzophenone, aliphatic mono-esters of 2,2',4-trihydroxy-4,-alkoxybenzophenone, 2-hydroxy-4-methoxy-2'-carboxybenzophenone;

Triazoles such as 2-phenyl-4-(2'-4'-dihydroxybenzoyl)triazoles, substituted benzotriazoles such as hydroxyphenyltriazoles such as 2-(2'hydroxy-5'-methylphenyl) benzotriazole, 2-(2'hydroxyphenyl)benzotriazole, 2-(2',-hydroxy-5',-octylphenyl)naphthotriazole;

Triazines such as 3,5-dialkyl-4-hydroxyphenyl derivatives of triazine, sulfur-containing derivatives of dialkyl-4-hydroxyphenyltriazines, hydroxyphenyl-1,3,5-triazines and such triazines containing sulfonic acid groups, aryl-1,3,5-triazines, orthohydroxyaryl-s-triazine;

Benzoates such as dibenzoate of diphenylolpropane, t-butyl benzoate of diphenylolpropane, nonyl phenyl benzoate, octyl phenyl benzoate, resorcinol dibenzoate.

Other ultraviolet light stabilizers that can be used include lower alkyl thiomethylene-containing phenols, substituted benzenes such as 1,3-bis(2'-hydroxybenzoyl)benzene, metal derivatives of 3,5,-di-t-butyl-4-hydroxyphenylpropionic acid, asymmetrical oxalic acid diarylamides, alkylhydroxyphenylthioalkanoic acid esters, dialkylhydroxyphenylalkanoic acid esters of di- and tri-pentaerythritol, phenyl- and naphthlene-substituted oxalic acid diamides, methyl-β-(3,5-di-t-butyl-4-hydroxyphenyl)propionate, α,α'-bis(2-hydroxyphenyl)diisopropylbenzene, 3,5'-dibromo-2'-hydroxyacetophenone, ester derivatives of 4,4-bis(4'-hydroxyphenyl)pentaonic acid wherein there is at least one unsubstituted position ortho to the aromatic hydroxyl groups, organophosphorus sulfides such as bis(diphenyl-phosphinothioyl)monosulfide and bis(diphenyl-phosphinothioyl)disulfide, 4-benzoyl-6-(dialkylhydroxybenzyl)resorcinol, bis(3-hydroxy-4-benzoylphenoxy)-diphenylsilane, bis(3-hydroxy-4-benzoylphenoxy)dialkylsilane, 1,8-naphthalimides, α-cyano-β, β-diphenylacrylic acid derivatives, bis(2-benzoxazolyl)alkanes, bis(2-naphthoxazolyl)alkanes, methylene malonitriles containing aryl and heteroacylic substitutes, alkylenebis(dithio)carbamate, 4-benzoyl-3-hydroxyphenoxyethyl acrylate, 4-benzoyl-3-hydroxyphenoxyethyl methacrylate, aryl or alkyl-substituted acrylonitriles, 3-methyl-5-isopropylphenyl-6-hydroxycourmarone, 8-acetyl-3-dodecyl-7,7,9,9-tetramethyl-1,3,8-triazasprio(4,5)decanol-2,4-dione.

Particularly useful ultraviolet light stabilizers that can be used are hindered amines of piperidyl derivatives such as those disclosed in Murayama et al., U.S. Pat. No. 4,061,616, issued Dec. 6, 1977, column 2, line 65, through column 4, line 2, and nickel compounds such as [1-phenyl-3-methyl-4-decanoylpyrazolate(5)]-Ni, bis[-phenyldithiocarbamato]-Ni(II), and others listed in the above patent, column 8, line 44 through line 55.

The following blend of ultraviolet light stabilizers can be used: 2-[2'-hydroxy-3',5'-1(1-1-dimethyl-propyl)-phenyl]benzotrizole and bis-[4-(1,2,2,6,6-pentamethyl-piperidyl)]2-butyl-2-[(3,5-t-butyl-4-hydroxyphenyl)methyl]propanedioate. The stabilizers can be sued in any ratio however, a 1:1 ratio of benzotriazole to propanedioate is preferred.

Another useful blend of ultraviolet light stabilizers is 2-(benzotriazole-2-VL)-4,6-bis(methyl-ethyl-1-phenyl ethyl)phenol, and 2(3 hydroxy-3,5,-ditert amyl phenyl) benzotriazole.

Generally, when the coating composition of this invention is used as a clear coating, it is applied by conventional spraying techniques, to a color or base coat of an automobile or truck, preferably, electrostatic spraying is used. The coatings are baked at about 60 to 140.C for about 10 to 40 minutes. In refinishing automobiles and trucks, the clear coating is applied to a color coat and then can be dried at ambient temperatures or baked to form a clear finish. The resulting clear coat or finish is about 1-5 mils thick, preferably 1-2 mils thick, and has excellent gloss, good adhesion to the color coat and excellent weatherability.

The composition can be pigmented to form a colored finish or primer. About 0.1-200% by weight, based on the weight of the binder, of conventional pigments can be added using conventional techniques in which a mill base containing pigment, dispersant and solvent is first formed. The mill base is then mixed with the composition to form a colored composition. This composition can be applied and cured as shown above. The following examples illustrate the invention. All parts and percentages are on a weight basis unless indicated otherwise. Molecular weights are determined by gel permeation chromatography using polymethyl methacrylate as the standard.

EXAMPLE 1

Anhydride Acrylic Polymer

The following constituents were charged into a reactor with a thermometer, stirrer, dropping funnel, nitrogen induction tube and condenser:

|  | Parts By Weight |
|---|---|
| Portion 1 | |
| Xylene | 182.4 |
| Butyl acetate | 20.2 |
| Portion 2 | |
| Methylmethacrylate monomer | 96.0 |
| Butylacrylate monomer | 293.4 |
| Xylene | 10.0 |
| Portion 3 | |
| Itaconic acid | 167.2 |
| Xylene | 59.8 |
| Portion 4 | |
| t-butylperacetate | 26.7 |
| Butyl acetate | 10.6 |
| Xylene | 6.7 |
| Total | 973.0 |

Portion 1 was charged into the reactor, covered with a nitrogen blanket and heated to its reflux temperature (approx. 135.C). Portion 2 is added dropwise over a 180 minute period. Portion 3 is added simultaneously with portions 2 and 4 over a 180 minute period as 5 minute increment shots of solid itaconic acid followed with washings of xylene. Portion 4 was premixed and added dropwise simultaneously with portions 2 and 3 over a 200 minute period. The resulting composition is then held at reflux until 22 pounds of water per 100 gallon batch size are removed.

The resulting polymer compisition had a weight solids content of 64–66% and the polymer had a Gardner-Holdt Viscosity of X-Z2. The polymer had a weight average moleculer weight of 3500.

A coating composition was prepared by thoroughly blending together the following constituents:

| | Parts By Weight |
|---|---|
| Anhydride acrylic polymer (prepared above) | 240.0 |
| Butyl acetate | 60.0 |
| Tinuvin 1130 ® (Ciba-Geigy UV screener) | 7.8 |
| Tinuvin 292 ® (Ciba-Geigy hindered amine light stabilizer) | 5.2 |
| Methyl hexahydroxyphthalic anhydride | 30.2 |
| Araldite CY-184 ® (di glycidylester from Ciba-Geigy) | 76.2 |
| 15.5% dimethyl ethanol amine (DMEA) in propanol | 52.6 |
| Total | 472.0 |

The resulting coating composition was sprayable at a higher solids content then can be achieved without the monomeric anhydride component. The weight solid content was 60% and it remained sprayable.

The resulting coating composition was reduced to spray viscosity of 35 seconds measured with a No. 2 Zahn Cup accomplished by adding butyl acetate.

The coating composition was sprayed onto a primed metal panel coated with a waterborne basecoat and cured at 180-200.F and provided a clear coat with excellent color, durability, humidity resistance and other film properties. The coating composition was also sprayed over solvent born melamine cured base coat and cured at 240°-295° F. The resulting coating exhibited excellent color, durability, humidity resistance and other film properties.

EXAMPLE 2

A coating composition was prepared by thoroughly blending together the following constituents:

| | Parts by Weight |
|---|---|
| Part I | |
| Anhydride acrylic polymer (As prepared in Example 1) | 218.1 |
| Methyl Hexahydrophthalic Anhydride | 39.9 |
| Tinuvin 1130 ® | 10.6 |
| Resiflow S ® (flow additive from Estron Chemical Company) | 1.8 |
| Propyleneglycolmonomethylether (PM acetate) | 50.3 |
| Ethyl Acetate | 13.1 |
| Part II | |
| Tinuvin 292 ® | 2.1 |
| 10% triethylene diamine in PM acetate | 56.8 |
| Part III | |
| Araldite CY-184 ® | 58.1 |
| Araldite XUGY-358 ® (Ciba-Geigy epoxy resin) | 71.7 |
| Total | 522.5 |

The premixed components were combined with mixing, the resulting solution was cast on glass panels and dried at ambient temperatures. The resulting coating was hard, glossy and attractive.

The coating composition had a solids content of 63.17% and a gallon weight of 8.98 lb/gal for a V.O.C. of 3.31 lb/gal.

We claim:

1. A coating composition comprising 20-80% by weight of reactive binder components and 80-20% by weight of an organic liquid carrier; wherein the binder consists essentially of about
   (a) 25-90% by weight, based on the weight of the binder, of an anhydride acrylic polymer having at least two reactive anhydride groups and consists of polymerized monomers of an ethylenically unsaturated anhydride or an ethylenically unsaturated dicarboxylic acid and polymerized monomers selected from the group consisting of alkyl methacrylate, alkyl acrylate and any mixtures thereof, wherein the alkyl groups have 1-8 carbon atoms and the polymer has a weight average molecular weight of about 2,000-50,000;
   (b) 5-50% by weight, based on the weight of the binder, of a glycidyl component having at least two reactive gylcidyl groups;
   (c) 5-40% by weight, based on the binder, of a monomeric oligomeric anhydride component; and
the composition contains about 0.1-5 % by weight, based on the weight of the binder, of a catalyst.

2. The coating composition of claim 1 in which the glycidyl component is selected from the group consisting of polyglycidyl ether of low molecular weight polyol, low molecular weight epoxy resins, polyglycidyl ester of polyacids, polyglycidyl ethers of isocyanurates, glycidyl methacrylate or glycidyl acrylate containing acrylic polymers or compatible mixture of any of the above.

3. The coating composition of claim 1 in which the anhydride acrylic polymer contains about 0.1-50% by weight of monomers selected from the group consisting of styrene, acrylonitrile, methacrylonitrile and any mixtures thereof.

4. The coating composition of claim 1 in which the anhydride acrylic polymer has a glass transition temperature of 0 to 70° C and a weight average molecular weight of about 3,000-25,000.

5. The coating composition of claim 1 in which the monomeric or oligomeric anhydride component is hexahydrophthalic anhydride, methlhexahydrophthalic anhydride, nadic methylanhydride or succinic anhydride or a mixture thereof.

6. The coating composition of claim 4 in which the anhydride acrylic polymer consists essentially of 20-40% by weight, based on the weight of the acrylic polymer of methyl methacrylate, styrene or mixture of methyl methacrylate and styrene, 35-55% by weight of an alkyl methacrylate or an alkyl acrylate having 2-4 carbon atoms in the alkyl group and 5-55% by weight of polymerizable ethylenically unsaturated anhydride, or an ethylenically unsaturated dicarboxylic acid.

7. The coating composition of claim 6 in which the glycidyl component comprises a polyglycidyl ether of a polyol or a di- or polyglycidylester of an acid.

8. The coating composition of claim 7 in which the anhydride acrylic polymer consists of polymerized monomers of methyl methacrylate, butyl acrylate and itaconic anhydride.

9. The coating composition of claim 7 in which the anhydride acrylic polymer consists of polymerized monomers of butyl acrylate, styrene, maleic anhydride and maleic acid.

10. The coating composition of claim 6 in which the anhydride acrylic polymer consists essentially of polymerized monomers of methyl methacrylate, styrene, butyl acrylate and itaconic anhydride;
    the glycidyl component consists essentially of sorbitol polyglycidyl ether or the di- or polyglycidylester of an acid or a mixture thereof and the catalyst is triethylene diamine or dimethyl ethanol amine or a mixture thereof.

11. The coating composition of claim 6 in which the anhydride acrylic polymer consists essentially of polymerized monomers of butyl acrylate, styrene, maleic anhydride and maleic acid;

the glycidyl component consists essentially of sorbitol polyglycidyl ether or the di- or polyglycidylester of an acid or a mixture thereof and the catalyst is triethylene diamine or dimethyl ethanol amine or a mixture thereof.

12. The coating composition of claim 1 containing about 0.1–200% by weight, based on the weight of the binder, of pigment.

13. The coating composition of claim 1 in which the acrylic polymer contains up to about 40% by weight of polymerized monomers alkyl acrylate, alkyl methacrylate or mixtures thereof having 9–12 carbon atoms in the alkyl groups.

14. A substrate coated with a layer of a waterborne basecoat and a clearcoat of the composition of claim 1 wherein the basecoat and clearcoat are cured at ambient or elevated temperatures.

15. A substrate coated with a layer of solvent borne melamine crosslinked basecoat and a clearcoat of the composition of claim 1 wherein the basecoat and clearcoat are cured at elevated temperatures.

* * * * *